July 22, 1969 W. M. RHYME 3,456,737
TURF REPAIR IMPLEMENT
Filed Feb. 25, 1966
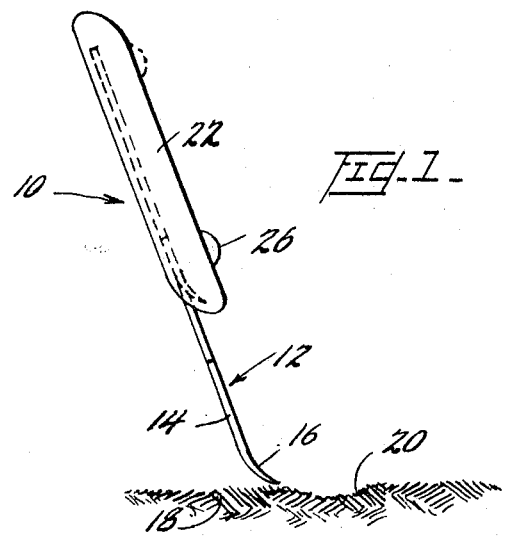
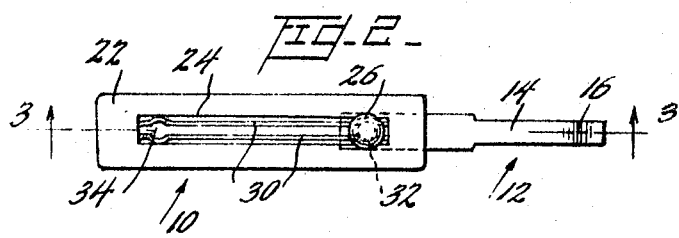
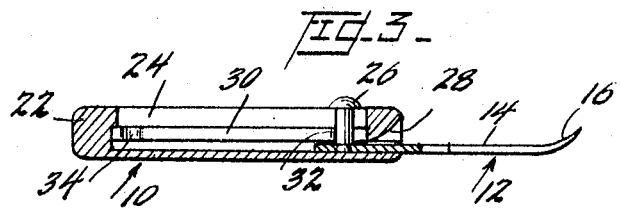
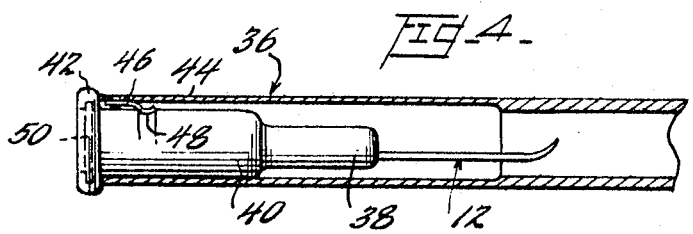
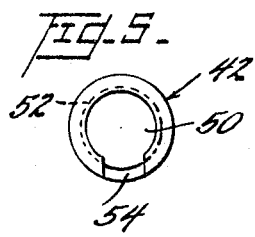
INVENTOR.
William M. Rhyme
BY
ATTORNEYS.

3,456,737
TURF REPAIR IMPLEMENT
William M. Rhyme, 306 De Witt St.,
Portage, Wis. 53901
Filed Feb. 25, 1966, Ser. No. 530,097
Int. Cl. A01b 1/00; A63b 53/00
U.S. Cl. 172—381                                    2 Claims

ABSTRACT OF THE DISCLOSURE

The invention disclosed comprises a turf repair implement including a blade with an upwardly arcuate sharpened edge portion for turf repair, and a handle member. The handle may be hollow for retracting the blade thereinto, or solid, and adapted for insertion into a hollow handle end of a golf club.

---

This invention relates to soil implements in general, and to a hand operated tool for repairing bruises in turf in particular.

The invention has special utility in the game of golf in preparing bruised greens for putting. As is well known to even the moderate golf enthusiast, the ideal approach shot to the green requires that the ball be lofted high into the air, with some backspin being imparted to the ball, so that the ball will "bite" into the green and roll only a few feet, thereby assuring that the ball will remain on the green ready for putting into the hole. However, this act often results in a deep bruise or hole left in the putting surface, or turf, which may interfere with putting the ball into the hole. The present invention is especially adapted for use by the golfer to quickly and efficiently repair such bruises or holes thereby leaving the green in suitable condition for putting.

Basically, the invention comprises a handle and a blade, the blade including a single, narrow stem and an upwardly arcuate, sharpened edge portion which is inserted around the edge of the bruise for lifting the depressed turf back into a normal position, flat with the surrounding putting surface. The handle may include means for retracting the blade thereinto when not in use, or the handle may be of solid construction, holding the blade rigidly, and adapted for insertion into a chamber, such as the hollow end of a golf club, preferably the putter, when not in use.

The prior art includes green repair tools having a forked working end for lifting a bruise. However, such a tool is likely to cause too much disturbance to the soil, particularly when repairing only a slight depression. Such pronged element enters the turf with more difficulty, as the bruised area contains compressed turf. The present invention overcomes these disadvantages by providing a single, relatively narrow working tool with an arcuate, sharpened end which will enter the compressed turf easily.

Therefore, it is the primary object of this invention to provide a turf repair implement having a single, relatively narrow blade, for repairing bruises in the turf.

It is another object of the invention to provide a turf repair tool having a handle into which the tool may be retracted when not in use.

Yet another object of the invention is to provide a turf repair tool having a handle adapted for insertion into a carrying chamber when not in use.

Finally, it is an object of the invention to provide a turf repair tool which is of optimum simplicity in mode of construction and method of operation, and low in cost of manufacture.

Further and more complete objects and advantages of the invention may be had by reference to the following specification and drawings in which:

FIGURE 1 is a side elevational view of the invention, showing the tool in proper position for repairing a bruise in the turf;
FIGURE 2 is a top, plan view of the invention;
FIGURE 3 is a sectional view, taken along lines 3—3 of FIG. 2;
FIGURE 4 is an elevational view of another embodiment of the invention, showing the same secured in a carrying chamber; and
FIGURE 5 is an end view of the invention as shown in FIGURE 4.

Referring now to the drawings by reference character, and in particular to FIGS. 1 to 3, the invention is shown comprising a handle 10 and blade 12. Blade 12 includes a stem portion 14 and an upwardly turned, arcuate edge portion 16. The stem portion 14 is relatively long and narrow, having a preferred width-length ratio of about 1 to 8 and a thickness-length ratio of about 1 to 11. As can be seen in FIGS. 2 and 3, edge 16 is formed in chisel fashion, sharpened at the end, and extending the width of stem portion 14. Thus fashioned, blade 12 may be easily inserted into turf 18, about the edge of a bruise 20. Arcuate edge 16 slips easily beneath bruise 20, following the contour thereof (FIG. 1). A slight, depressing motion imparted to the rear of handle 10 will cause the bruise 20 to be lifted to a normal position, thus repairing the turf 18. Finally, blade 12 may be withdrawn from the turf 18 with a slight, upward curving motion, thereby causing only minimal disturbance to the turf 18.

In one embodiment of the invention, handle 10 is in the form of a case 22, having an elongated slot 24 formed along the top edge thereof (FIGS. 1–3). An actuator 26, in the form of a rivet, is mounted on the rear end of blade 12, and extends upwardly through slot 24 to be engaged by the thumb of an operator. Thus, to move the invention to a working position, handle 12 may be grasped, and actuator 26 pushed forwardly until blade 12 is fully extended. The blade 12 may be retracted into case 22 when not in use by merely exerting thumb pressure on actuator 26 away from the forward end of case 22 until the blade 12 reaches the position shown in dash lines in FIG. 1. As indicated by FIG. 3, a small recess 28 is provided in the forward end of case 22 to accommodate arcuate edge 16 when blade 12 is in a retracted position. If desired, a pair of leaf springs 30, 30 may be mounted along opposing, interior walls of slot 24 and may be divergingly, outwardly bent at their terminal ends to form chambers 32, 34 which serve to secure actuator 26 when blade 12 is in a working, extended position, and in a non-working, retracted position, respectively.

A second embodiment of the invention is shown in FIGS. 4 and 5. The handle 36 of this embodiment includes a support portion 38 for blade 12, and a cylindrical base portion 40. A cap 42 is mounted on the end of base portiont 40. When not in use, the invention may be carried in hollow, cylindrical chamber 44, such as the upper end of a golf club. Preferably, the invention will be carried in the end of the putter, as this is the club used on the green. The invention may be secured in chamber 44 by any suitable means, such as by a resilient spring clip 46. A mating recess 48 may be formed in base portion 40 to cooperate with clip 46. As indicated in FIG. 5, a ball marker 50 may be carried in cap 42. A resilient shoulder 52 is formed on cap 42 to retain marker 50 thereon when not in use. A slot 54 may be cut in shoulder 52 to permit easy insertion and withdrawal of marker 50.

It is readily apparent from the foregoing that I have invented a new and highly useful device in the art of turf implements.

I claim:
1. A turf repair implement adapted for lifting depressions in said turf comprising a handle and a blade, said blade comprising a single, flat stem portion and a single, upwardly turned, arcuate end portion, the terminus thereof being a sharpened edge having a width substantially equal to the width of said stem portion, said edge disposed substantially at an angle of 90° to the length of said stem portion, said handle comprising a hollow case for receiving the blade when said blade is in a non-working, retracted position and for supporting the blade when said blade is in a working, extended position, said case including means for moving said blade to the working and non-working positions, comprising wall means defining a slot through a side of the case, an actuator, secured to the rear of the blade and extending through the slot, the actuator being movable in the slot between terminal ends thereof, and spring clamp means mounted along opposing long sides of the slot, said spring clamp means formed into locking chambers at said terminal ends for receiving the actuator.

2. The device of claim 1 wherein said single, flat stem portion comprises a working segment, disposed exteriorally of said handle and a nonworking support segment, disposed interiorally of said handle, the ratio of the width of said working segment to the length thereof being on the order of 1 to 8 and the ratio of the thickness of said working portion to the length thereof being on the order of 1 to 11.

References Cited

UNITED STATES PATENTS

| 134,224 | 12/1872 | Sherwood | 172—381 |
| 2,707,325 | 5/1955 | Cripps | 30—1 |
| 3,360,807 | 1/1968 | Mauck | 15—237 X |
| 2,735,176 | 2/1956 | Costin | 30—162 |
| 3,185,483 | 5/1965 | Klynman | 273—162 |

ABRAHAM G. STONE, Primary Examiner

W. J. CONLON, Assistant Examiner

U.S. Cl. X.R.

273—162